United States Patent
Fujimoto et al.

(10) Patent No.: US 8,123,232 B2
(45) Date of Patent: Feb. 28, 2012

(54) SEALING APPARATUS AND GAS TURBINE HAVING SAME

(75) Inventors: Kiyoshi Fujimoto, Takasago (JP);
Hiroaki Kishida, Takasago (JP);
Kuniaki Aoyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 495 days.

(21) Appl. No.: 12/190,929

(22) Filed: Aug. 13, 2008

(65) Prior Publication Data
US 2009/0026713 A1      Jan. 29, 2009

(30) Foreign Application Priority Data
Feb. 17, 2006   (JP) .................................. 2006-041012

(51) Int. Cl.
*F16J 15/02*       (2006.01)
(52) U.S. Cl. .................. 277/644; 277/654; 415/135
(58) Field of Classification Search .............. 277/644, 277/654, 906; 415/135, 210.1
See application file for complete search history.

(56) References Cited

U.S. PATENT DOCUMENTS

| 4,603,892 | A | * | 8/1986 | Abbes et al. | 285/336 |
| 4,902,198 | A | * | 2/1990 | North | 415/115 |
| 6,431,825 | B1 | * | 8/2002 | McLean | 415/135 |
| 7,788,932 | B2 | * | 9/2010 | Kunitake et al. | 60/797 |
| 2001/0019695 | A1 | * | 9/2001 | Correia | 415/135 |
| 2005/0179215 | A1 | * | 8/2005 | Kono | 277/628 |

FOREIGN PATENT DOCUMENTS

| JP | 2005-076802 A | 3/2005 |
| JP | 2005-233251 A | 9/2005 |

OTHER PUBLICATIONS

Japanese Office Action issued in corresponding Japanese Patent Application No. 2006-041012, mailing date Jun. 15, 2010.

* cited by examiner

*Primary Examiner* — Vishal Patel
(74) *Attorney, Agent, or Firm* — Westerman, Hattori, Daniels & Adrian, LLP

(57) ABSTRACT

It is an object of the present invention to provide a sealing apparatus having high sealing performance, entailing a low cost, and satisfactory in assembly characteristics. The sealing apparatus is a differential pressure-responsive sealing apparatus which is inserted between seal grooves formed in the side surfaces of outlet flange portions of adjacent combustor transition pipes to seal clearance between the side surfaces, comprising: a minimum required number of seal pieces connected in the longitudinal direction for imparting flexibility, the seal piece comprising a heat resistant, wear resistant material, and having a pair of sealing ridges each having an arcuate surface contacting the wall surface of each seal groove.

8 Claims, 7 Drawing Sheets

SEALING APPARATUS AND GAS TURBINE HAVING SAME

BACKGROUND OF THE INVENTION

1. Field of the Invention

This invention relates to a sealing apparatus, and a gas turbine having this apparatus. More particularly, the invention relates to a sealing apparatus for sealing clearance between assembly components which changes owing to external force or thermal expansion or the like, for example, a sealing apparatus suitable as a seal between gas turbine combustors at their outlets.

2. Description of the Related Art

Generally, a gas turbine has an air compressor (may hereinafter be referred to as "compressor"), a combustor, and a turbine as main constituents. The combustor is disposed between the compressor and the turbine connected together directly by a rotating shaft. Air to serve as a working fluid is taken into the compressor in accordance with the rotation of the rotating shaft, and compressed there. The compressed air is introduced into the combustor, and burned with a fuel. The resulting combustion gas at a high temperature and a high pressure is ejected to the turbine to drive the rotating shaft as well as the turbine rotationally. Such a gas turbine is effectively used as a drive source for a power generator or the like which is connected to the front end of the rotating shaft.

In recent years, a low $NO_x$ (premix) combustor has been used frequently from the aspect of pollution control over air pollution, etc. With the low $NO_x$ (premix) combustor, a larger amount of combustion air is needed for decreasing $NO_x$. Thus, a sealing apparatus is applied to each part of the gas turbine to manage air leakage strictly.

Examples of the sealing apparatus used as a seal between gas turbine combustors at the outlets of the combustors are shown in FIGS. 5 to 7.

FIG. 5 shows a brush seal 102 used as a seal between gas turbine combustors at the outlets of the combustors (i.e., a side seal). The brush seal 102 comprises a rail 102a to be fitted into a groove formed in a wall portion of one of transition pipes, and a wire brush 102b whose leading end is pressed against the back of a flange portion of the other transition pipe and which is composed of wires densely planted in the rail 102a. The brush seal 102 is adapted to reduce air leakage from the casing side to the turbine side.

FIG. 6 shows a so-called worm seal 104 comprising many I-shaped punched-out pieces 104a tied in a row with the use of a flexible sheet 104b. The worm seal 104 seals clearance between flange portions of adjacent transition pipes, thereby reducing air leakage from the casing side to the turbine side. The worm seal 104 serves for sealing when it is inserted into grooves formed in the adjacent transition pipes, and a pair of arcuate projections 104ab of the worm seal 104 are pressed against the wall surfaces of the grooves under a differential pressure between the casing and the interior of the combustor.

FIG. 7 shows a sealing apparatus for sealing clearance between connecting surfaces (opposing surfaces) of the end surface of one component 106A and the end surface of other component 106B. This sealing apparatus is mounted in a space portion between groove-shaped stepped portions formed in the connecting surfaces. The sealing apparatus comprises a sealing body 107 composed of a support portion 107A having a first seal protrusion 107A1 in intimate contact with a second step surface 106A2 of the one component 106A and a second seal protrusion 107A2 in intimate contact with a second step surface 106B2 of the other component 106B, and a holding portion 107B formed to be upright on the support portion 107A; a first seal member 108 having a second side portion 108C secured to the side surface of the holding portion 107B, a curved elastic portion 108B, and an inclined first side portion 108A, the second side portion 108C, the elastic portion 108B, and the first side portion 108A being formed in the shape of a U-plate; a second seal member 109 disposed on the side surface of the holding portion 107B in symmetrical relation with the first seal member 108, having a second side portion 109C secured to the side surface of the holding portion 107B, and having nearly the same configurational requirements as those of the first seal member 108; a first seal surface 108A1 in intimate contact with a first step surface 106A1 of the one component 106A at an outward surface of an end portion of the first side portion 108A of the first seal member 108; and a second seal surface 109A1 in intimate contact with a first step surface 106B1 of the other component 106B at an outward surface of an end portion of the first side portion 109A of the second seal member 109. As noted above, end sides of the second side portions 108C and 109C are secured to the holding portion 107B. In this manner, the assembly clearance between the components where a high temperature fluid flows, or the assembly clearance between the components involving vibrations can be always sealed (see JP-A-2005-76802).

However, the seal shown in FIG. 5 has posed the problem that the deformation of the wire brush 102b at the time of combustor assembly and after operation of the gas turbine is marked, arousing a concern about deterioration of performance, so that the seal is difficult to apply to a low $NO_x$ (premix) combustor. That is, the wire brush 102b may collapse or wear when the clearance changes at the time of combustor assembly, during operational vibrations, or at start or stoppage of the gas turbine. There has also been the problem that the cost for repair of the combustor increases because of replacement work necessitated by deformation after operation.

With the seal shown in FIG. 6, higher sealing performance than that of the brush seal 102 in FIG. 5 has been confirmed. However, increases in processing man-hours and the number of the components have presented the problem of cost increases.

The sealing apparatus shown in FIG. 7 has involved the problems that an increase in the number of the components results in a cost increase, and the sealing body 107 is integrally formed, and lacks flexibility, leading to poor assembly characteristics within a narrow space.

SUMMARY OF THE INVENTION

The present invention has been accomplished in light of the above-described situations. It is an object of the invention to provide a sealing apparatus having high sealing performance, entailing a low cost, and satisfactory in assembly characteristics, and a gas turbine equipped with the sealing apparatus.

A first aspect of the present invention is a differential pressure-responsive sealing apparatus which is inserted between seal grooves formed in end surfaces of adjacent members to seal clearance between the end surfaces, comprising: a minimum required number of seal pieces connected in a longitudinal direction for imparting flexibility, the seal piece comprising a heat resistant, wear resistant material, and having a pair of sealing ridges each having an arcuate surface contacting a wall surface of each seal groove.

A plurality of the seal pieces formed by machining or press-working may be connected by a flexible sheet joined to the seal pieces while spanning flat side surfaces of the seal pieces.

The seal pieces formed by press-working to have the sealing ridges of a semi-annular cross section may be laminated in a superposed manner, and a plurality of the seal pieces laminated may be tied together by wires each inserted into a circular hole formed by two of the sealing ridges opposing each other.

A sealing metal foil may be interposed between connecting surfaces of the seal pieces, i.e., the seal pieces connected in the longitudinal direction.

The present invention can realize the sealing apparatus which has a small number of the components, whose production is easy, and which is wear resistant. Thus, the sealing apparatus has high sealing performance, and can achieve cost reduction. Furthermore, the flexible sheet can impart moderate flexibility, and thus can enhance assembly characteristics.

A second aspect of the present invention is a gas turbine in which a seal between gas turbine combustors at outlets of the gas turbine combustors is constructed using the above-mentioned sealing apparatus.

The gas turbine of the present invention enables the performance of a low $NO_x$ (premix) combustor to be fully exhibited.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A sealing apparatus, and a gas turbine using the apparatus, according to the present invention will be described in detail by the following embodiments with reference to the accompanying drawings.

Embodiment 1

Figure 1:
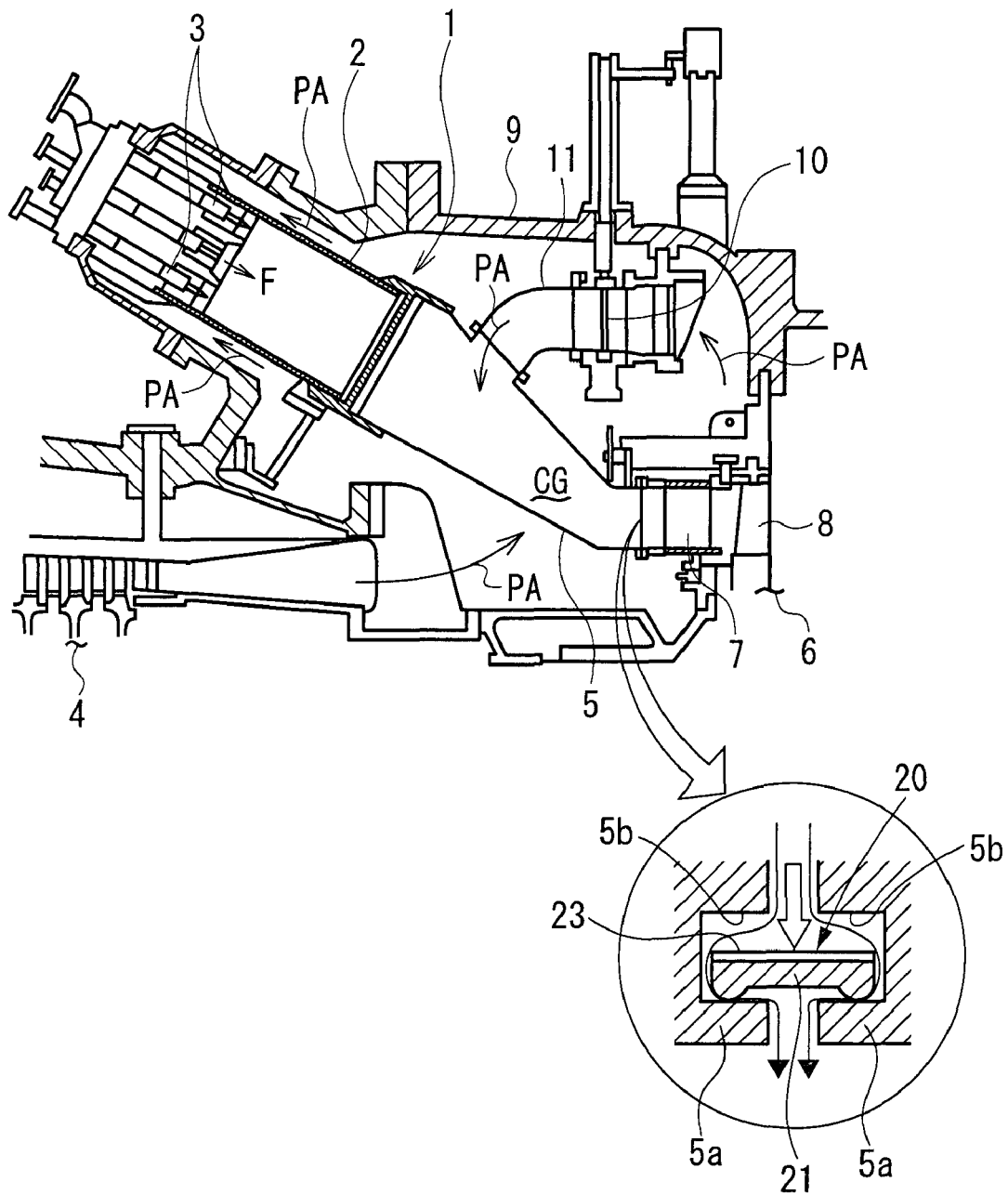
FIG. 1 is a schematic configurational drawing of essential parts of a gas turbine showing Embodiment 1 of the present invention.
Figure 2:
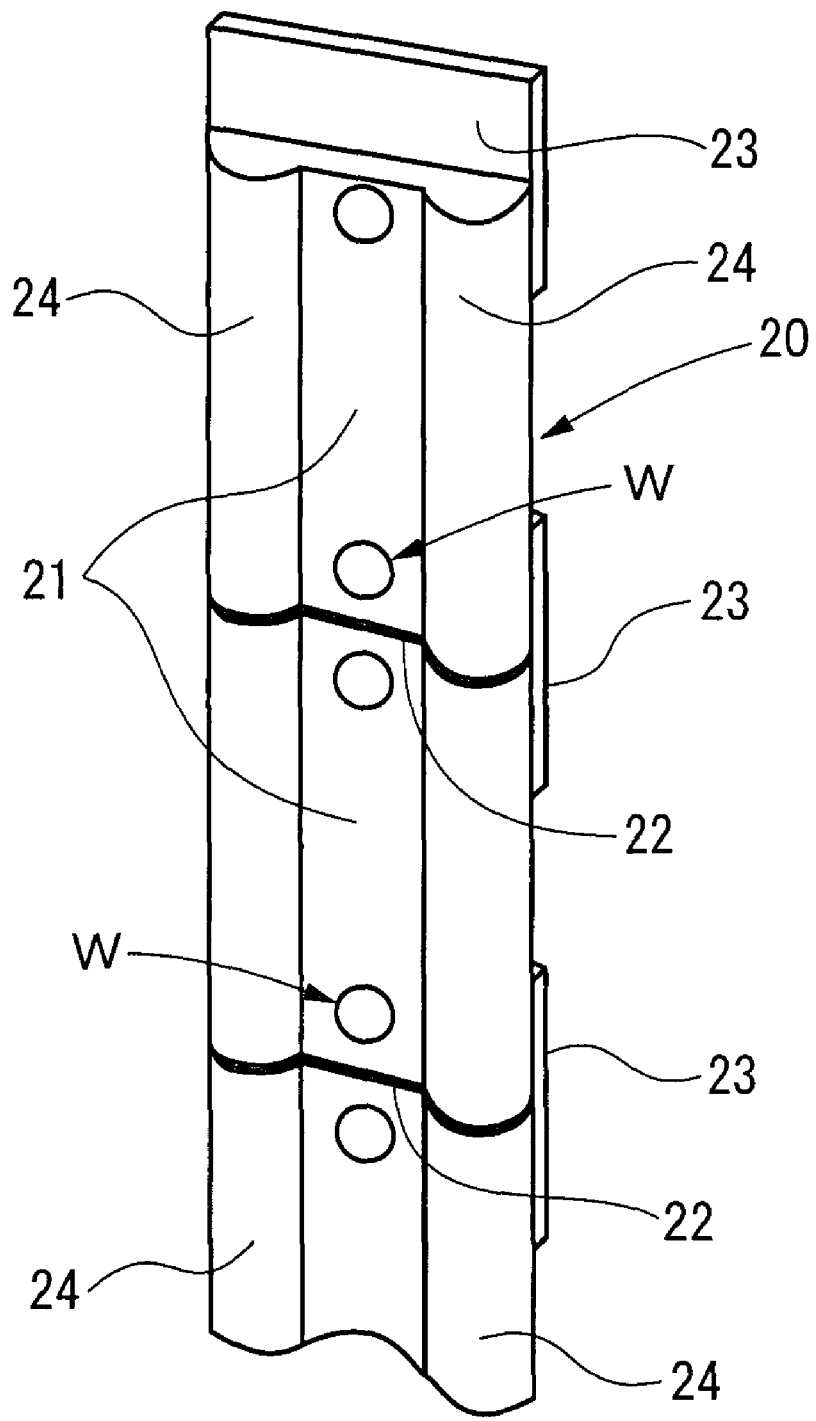
FIG. 2 is a perspective view of essential parts of a sealing apparatus in the gas turbine.

FIG. 1 is a schematic configurational drawing of essential parts of a gas turbine showing Embodiment 1 of the present invention. FIG. 2 is a perspective view of essential parts of a sealing apparatus in the gas turbine.

As shown in FIG. 1, a gas turbine has a plurality of (e.g., 16) combustors 1 of a low $NO_x$ (premix) type arranged around a main shaft (rotating shaft; not shown). In each combustor 1, a fuel F injected from fuel nozzles 3 provided adjacent to a combustor inner tube 2, and compressed air PA ejected from an air compressor (will hereinafter be referred to simply as a compressor) 4 and introduced to the upstream side of the combustor inner tube 2 are mixed. Then, the mixture is burned in a combustion region on the downstream side of the combustor inner tube 2 or the upstream side of a combustor transition pipe 5, and is introduced into a turbine 6 as a high temperature, high pressure combustion gas CG. In the turbine 6, this combustion gas CG is sequentially passed through and expanded by a plurality of turbine stages each comprising a stationary blade 7 and a moving blade 8 to generate power, thereby driving the compressor 4 as well as outputting a surplus drive force to the outside.

The ratio between the compressed air PA and the fuel F (air-fuel ratio) introduced into the combustor inner tube 2 needs to be controlled to an optimal value in conformity with the operating state of the gas turbine (i.e., the amount of the fuel introduced). For this purpose, not all of the compressed air PA is introduced into the combustion region of the combustor 1, but part of the compressed air PA is bypassed and flowed from a casing 9 into the combustor transition pipe 5. A bypass valve 10 is provided for this purpose and, by its action, part of the compressed air PA is flowed and supplied into the combustor transition pipe 5 through an opening of a bypass pipe 11 provided within the casing 9.

In the present embodiment, a sealing apparatus 20 as a seal between the combustors (side seal) is interposed between outlet flange portions 5a and 5a of the adjacent combustor transition pipes 5. That is, seal grooves 5b of a rectangular cross section are formed to oppose each other, in the side walls of the adjacent combustor transition pipes 5. The sealing apparatus 20 is loosely fitted between these seal grooves 5b and 5b.

The sealing apparatus 20 comprises a plurality of (2 to 4; in the illustrated example, 3 or more) seal pieces 21 of the same shape connected in the longitudinal direction, as shown in FIG. 2. Concretely, a sealing metal foil 22 is interposed between connecting surfaces of the respective seal pieces 21, and the seal pieces 21 are coupled by a sheet 23 which is spot-welded (W) to the respective seal pieces 21 while spanning their flat side surfaces, and which is shorter than the seal piece 21 and has flexibility.

On the side surface of each seal piece 21 on the side opposite to the flat side surface thereof, sealing ridges 24 of a semicircular cross section extend in the longitudinal direction at right and left portions of the seal piece 21 in the drawing. The seal piece 21 is manufactured by machining or press-working a heat resistant, wear resistant alloy material such as Highness-25 (commercial name). The seal piece 21 may be provided with a wear resistant coating (chromium carbide or the like), as is the aforementioned seal groove 5b. The length of the sealing apparatus 20 is set to be nearly equal to the height of the outlet flange portion 5a of the combustor transition pipe 5. The above-mentioned sheet 23 is manufactured from the same material as that for the seal piece 21.

Because of the above features, the sealing apparatus 20 is inserted into the seal grooves 5b between the outlet flange portions 5a of the adjacent combustor transition pipes 5, after the combustors 1 are assembled to the gas turbine body. During operation of the gas turbine, as shown in the blow-off area of FIG. 1, the seal piece 21 of the sealing apparatus 20 is pressed against the wall surfaces of the seal grooves 5b under the differential pressure between the casing 9 and the combustor 1 (see an open thick arrow in the drawing), whereby leaking air (see thin arrows in the drawing) between the adjacent outlet flange portions 5a is sealed up.

On this occasion, the pair of sealing ridges 24 of the seal piece 21 contact the wall surfaces of the adjacent seal grooves 5b such that one sealing ridge contacts one wall surface. Thus, even if displacement between the adjacent outlet flange portions 5a occurs in the flowing direction of leaking air because of deformation due to thermal expansion, the contact on the arcuate surface is maintained, and wear or the like attributed to contact of the edge portion is effectively avoided.

According to the present embodiment, as described above, the sealing apparatus 20 can be realized which has a small number of the components, whose production is easy, and which is wear resistant. Thus, it has high sealing performance, and can achieve cost reduction, and is optimal when used in a low $NO_x$ (premix) combustor. Furthermore, the flexible sheet 23 can impart moderate flexibility, thus making it possible to enhance assembly characteristics within a narrow space.

The interposition of the metal foil 22 is not compulsory. Instead of the spot welding W, other joining means, such as brazing, may be employed.

Embodiment 2

Figure 3:
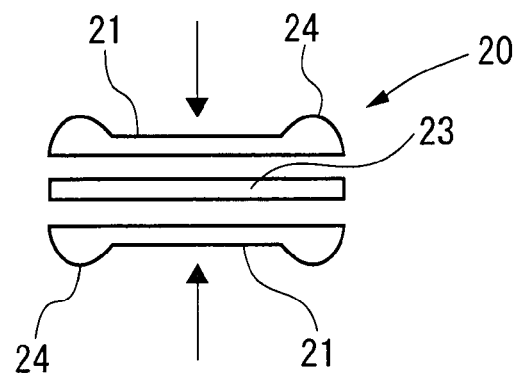
FIG. 3 is a plan view of a sealing apparatus showing Embodiment 2 of the present invention.
Figure 3:
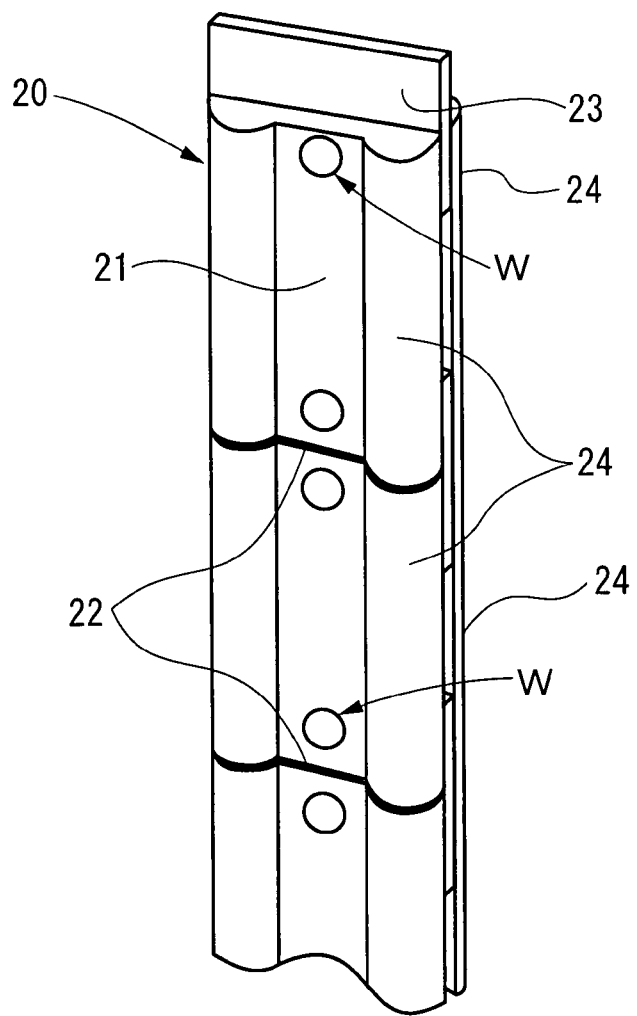

FIG. 3 is a plan view of a sealing apparatus showing Embodiment 2 of the present invention.

This is an embodiment in which the seal pieces 21 in Embodiment 1 are arranged symmetrically on both surfaces of the sheet 23. The sealing apparatus according to this embodiment can be used as a sealing apparatus between components when the flowing direction of leaking air is reversed in the seal groove 5b.

Embodiment 3

Figure 4:
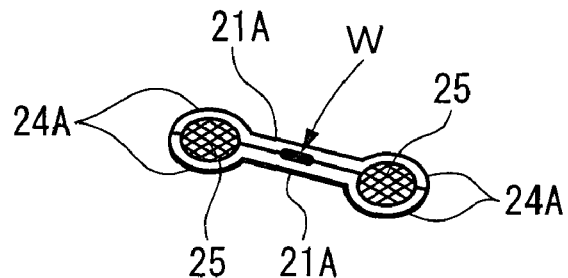
FIG. 4 is a configurational drawing of a sealing apparatus showing Embodiment 3 of the present invention.
Figure 4:
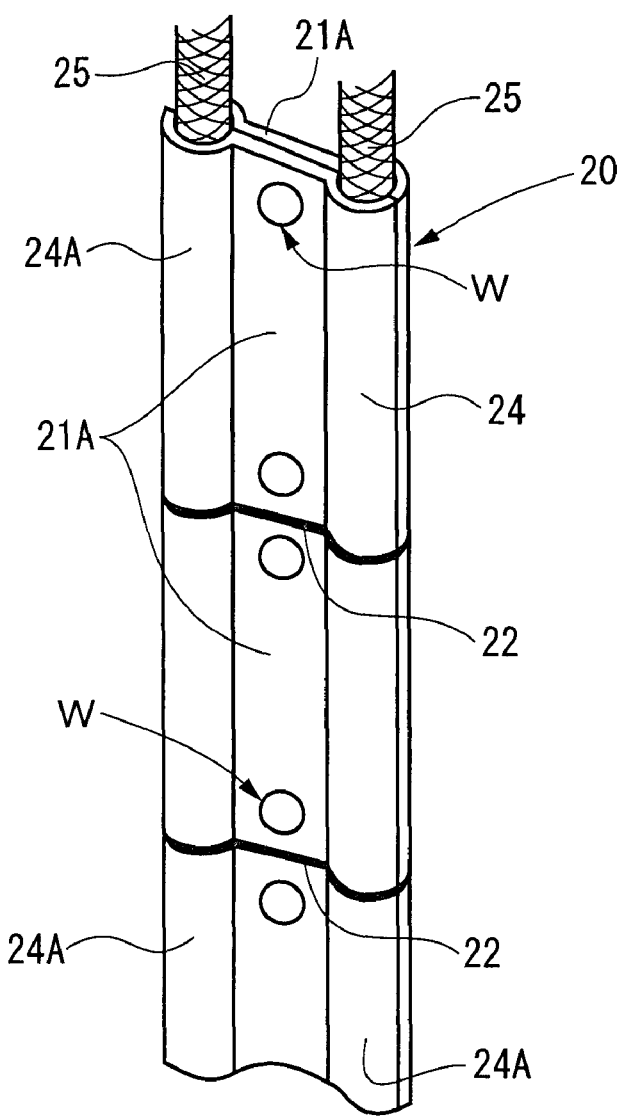
Figure 5:
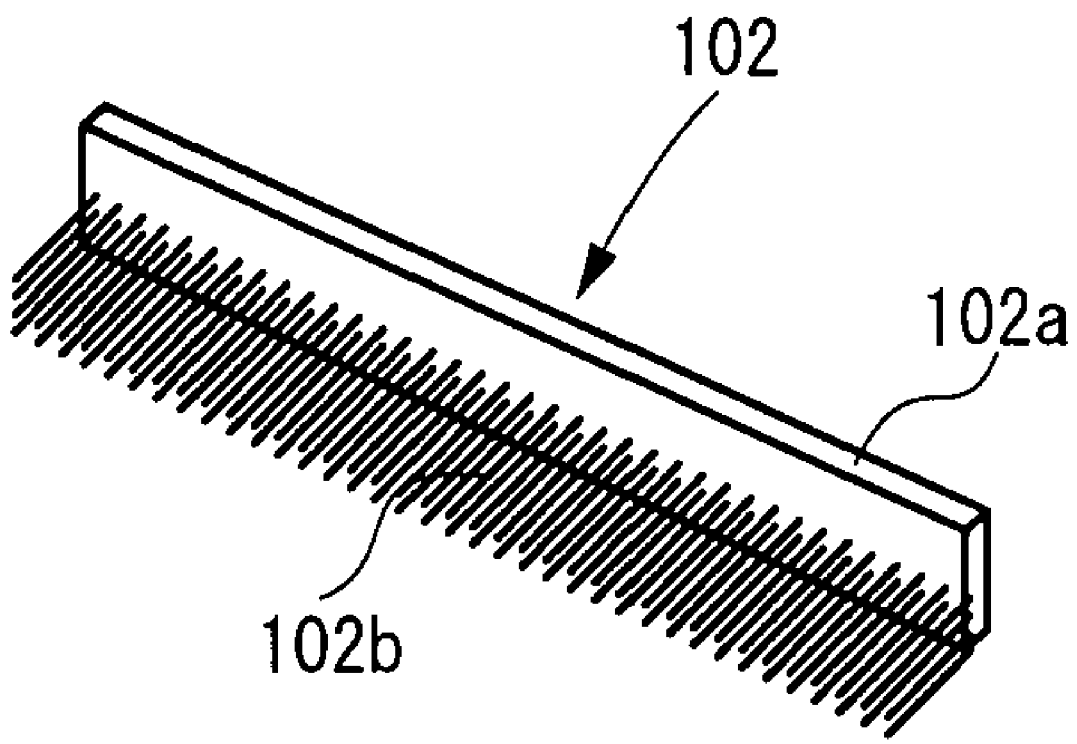
FIG. 5 is a configurational drawing of a conventional brush seal.
Figure 6:
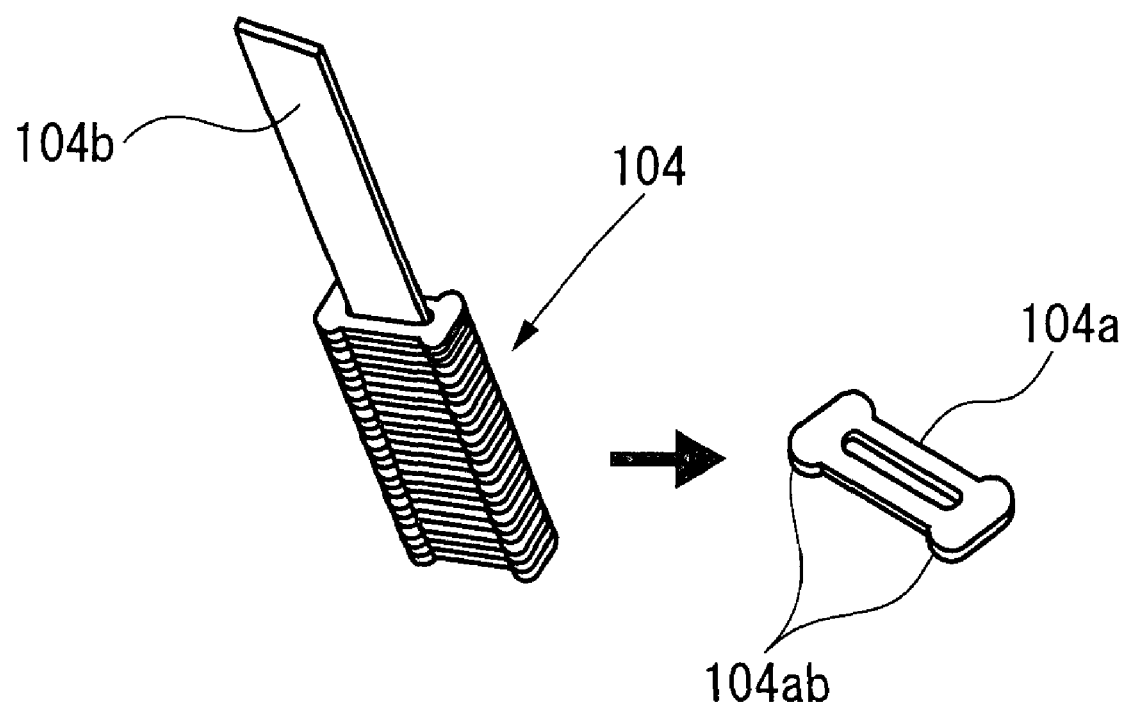
FIG. 6 is a configurational drawing of a conventional worm seal.
Figure 7:
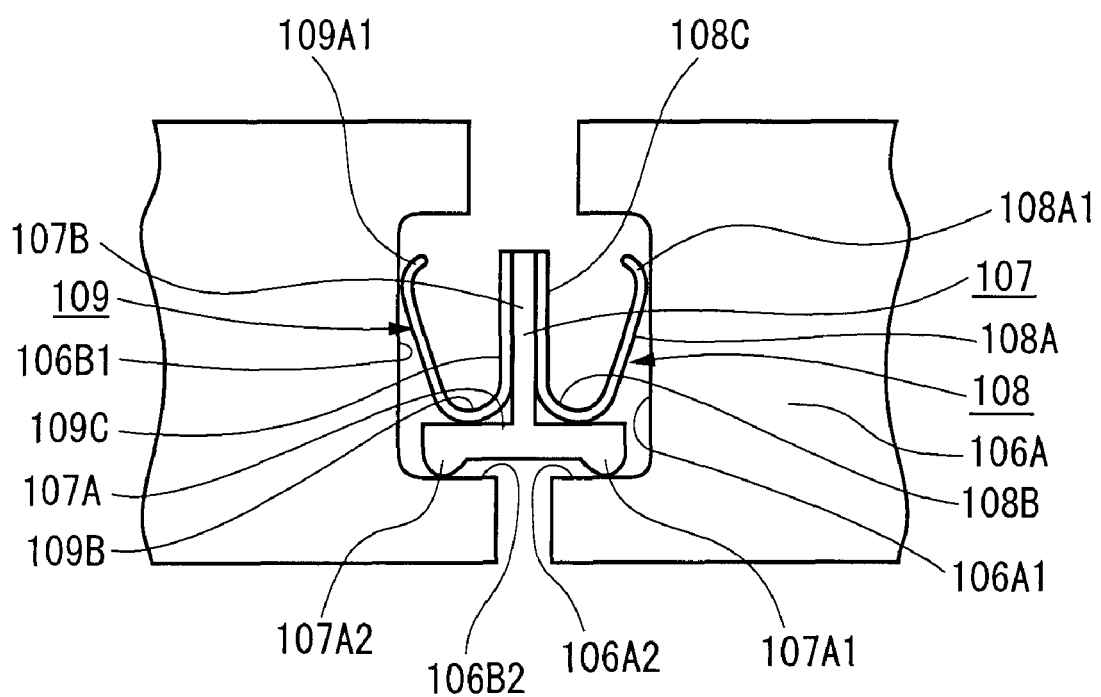
FIG. 7 is a configurational drawing of a conventional further different sealing apparatus.

FIG. 4 is a configurational drawing of a sealing apparatus showing Embodiment 3 of the present invention.

This is an embodiment in which seal pieces 21A as in Embodiment 1, formed by press-working to have sealing ridges 24A of a semi-annular cross section, are laminated in a superposed manner by spot welding W, and a plurality of the resulting laminates are tied (connected) together in the longitudinal direction by two wires 25. That is, each wire 25 is inserted into the circular hole formed by the two sealing ridges 24A opposing each other.

According to the present embodiment, like Embodiment 1, the sealing apparatus 20 can be realized which has a small number of the components, whose production is easy, and which is wear resistant. Thus, it has high sealing performance, and can achieve cost reduction. Since the core material is the wire 25, moreover, moderate flexibility can be imparted, and assembly characteristics can also be enhanced.

While the present invention has been described by the above embodiments, it is to be understood that the invention is not limited to these embodiments, but may be varied in many other ways. For example, the sealing apparatus according to the present invention can be applied not only to a sealing apparatus at the outlets of gas turbine combustors, but also to a sealing apparatus for an assembly clearance between components for flow of other fluid, or an assembly clearance between components involving vibrations. Such variations are not to be regarded as a departure from the spirit and scope of the invention, and all such modifications as would be obvious to one skilled in the art are intended to be included within the scope of the appended claims.

What is claimed is:

1. A differential pressure-responsive sealing apparatus which is inserted between seal grooves formed in end surfaces of adjacent members to seal clearance between the end surfaces, comprising:
    a plurality of seal pieces connected in a longitudinal direction for imparting flexibility, the seal piece comprising a heat resistant, wear resistant material, and having a pair of sealing ridges each having an arcuate surface contacting a wall surface of each seal groove, and
    the seal pieces, formed by machining or press-working, are connected by a plurality of flexible sheets that join flat side surfaces of the respective seal pieces,
    wherein the length of each of the flexible sheets in the longitudinal direction being shorter than the length of each of the seal pieces connected in the longitudinal direction.

2. The sealing apparatus according to claim 1, wherein the seal pieces formed by press-working to have the sealing ridges of a semi-annular cross section are laminated in a superposed manner, and a plurality of the seal pieces laminated are tied together by wires each inserted into a circular hole formed by two of the sealing ridges opposing each other.

3. The sealing apparatus according to claim 1, wherein a sealing metal foil is interposed between connecting surfaces of the seal pieces.

4. The sealing apparatus according to claim 1, wherein a sealing metal foil is interposed between connecting surfaces of the seal pieces connected in the longitudinal direction.

5. The sealing apparatus according to claim 2, wherein a sealing metal foil is interposed between connecting surfaces of the seal pieces connected in the longitudinal direction.

6. A gas turbine in which a seal between gas turbine combustors at outlets of the gas turbine combustors is constructed using the sealing apparatus according to claim 1, 2 or 3.

7. A differential pressure-responsive sealing apparatus which is inserted between seal grooves formed in end surfaces of adjacent members to seal clearance between the end surfaces, comprising:
    a minimum required number of seal pieces connected in a longitudinal direction for imparting flexibility, each of the seal piece constitutes a heat resistant, wear resistant material, and having a pair of sealing ridges each having an arcuate surface contacting a wall surface of each of the seal groove, the seal pieces formed by press-working to have the sealing ridges of a semi-annular cross section are laminated in a superposed manner, and the seal pieces laminated are tied together by wires each inserted into a circular hole formed by two of the sealing ridges opposing each other,
    wherein a sealing metal foil is interposed between connecting surfaces of the seal pieces connected in the longitudinal direction.

8. A gas turbine in which a seal between gas turbine combustors at outlets of the gas turbine combustors is constructed using the sealing apparatus according to claim 7.

* * * * *